(12) United States Patent
Masek

(10) Patent No.: US 7,716,263 B2
(45) Date of Patent: May 11, 2010

(54) SCALABLE METHOD AND SYSTEM FOR PROVIDING REAL TIME INDICATIONS OF CURRENTLY OPEN DOCUMENTS

(75) Inventor: William J. Masek, Bedford, MA (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 11/611,815

(22) Filed: Dec. 15, 2006

(65) Prior Publication Data

US 2008/0147695 A1    Jun. 19, 2008

(51) Int. Cl.
G06F 17/30    (2006.01)
(52) U.S. Cl. .................. 707/999.101; 707/999.102; 707/E17.009; 709/206; 715/734
(58) Field of Classification Search .................. None
See application file for complete search history.

(56) References Cited

U.S. PATENT DOCUMENTS

| | | | |
|---|---|---|---|
| 6,606,657 B1 | 8/2003 | Zilberstein et al. | |
| 2003/0074451 A1* | 4/2003 | Parker et al. | ................ 709/227 |
| 2005/0004995 A1 | 1/2005 | Stochosky | |
| 2005/0102358 A1 | 5/2005 | Gold et al. | |
| 2005/0165893 A1* | 7/2005 | Feinberg et al. | ............. 709/205 |
| 2005/0166154 A1 | 7/2005 | Wilson et al. | |
| 2005/0177385 A1 | 8/2005 | Hull et al. | |
| 2006/0089978 A1 | 4/2006 | Lee et al. | |
| 2006/0101071 A1 | 5/2006 | Henderson | |
| 2006/0117264 A1 | 6/2006 | Beaton et al. | |
| 2008/0005090 A1* | 1/2008 | Khan et al. | .................... 707/4 |

\* cited by examiner

*Primary Examiner*—Don Wong
*Assistant Examiner*—Shyue Jiunn Hwa
(74) *Attorney, Agent, or Firm*—David A. Dagg

(57) ABSTRACT

A system for providing indications of documents currently opened by members of a group, in which document open and close operations are detected, and conveyed to a server system. The server system receives the document operation messages, and uses them to maintain lists of open documents associated with individual users through records in a user database that also indicate individual users' on-line status. When the server system transmits the on-line status of a user to other users that have an interest in that user (e.g. fellow members of a collaboration team, development project or the like, or user's having entered that user in their buddy list, etc.), an open documents list for that user is included in the message along with his or her on-line status information. The client systems maintain lists of currently accessing users for open documents they have received identifiers of within open documents lists contained in such on-line status messages. As a result, a user can select a user interface view, such as a file directory or other type of interface providing indications of multiple shared documents, and the disclosed system allows the user to quickly determine which documents are currently open by other users in a group.

15 Claims, 7 Drawing Sheets

SCALABLE METHOD AND SYSTEM FOR PROVIDING REAL TIME INDICATIONS OF CURRENTLY OPEN DOCUMENTS

FIELD OF THE INVENTION

The present invention relates generally to collaboration software systems, and more specifically to extending collaboration software systems so that they provide a scalable method and system for providing indications of active documents.

BACKGROUND OF THE INVENTION

As it is generally known, screen names in "buddy lists" generated by existing instant messaging systems include visual displays of users' online status, including indications of which users are currently on-line and available for instant messaging sessions. These user representations are sometimes referred to as "live names", and are helpful in supporting the real time communications provided in systems such as instant messaging. The on-line awareness provided through live names in a buddy list is an enabler with regard to instant messaging, since a user might initiate an instant messaging session if they are aware that another user is currently on-line. If the live name for a user in a buddy list indicates they are not currently on-line, then an alternative mode of communication might be selected to contact them, such as electronic mail ("e-mail").

In collaborative systems users often work together on a single document. In these instances it is useful to know who else is working on the document at a point in time. Users can coordinate their efforts on the document, or it may reveal opportunities to collaborate on the document.

Some existing systems have attempted to provide indications of which documents are currently being edited by another user. In some such systems, users are provided with a cue when another user is viewing or editing a document, and may further be notified when a document has been changed. Some existing systems have also allowed initiation of an instant messaging system with another user that is currently editing a document. These systems do not scale in realistic operational environments.

In addition, some existing source code control systems have enabled users to lock documents when they open them, such that other users cannot open them, and such that other users can see when a document is locked. The indication that a document is locked is an indication that the document is reserved to another user. The locked status of a document is maintained persistently across logins and logouts of the reserving user. Users of such systems often reserve or lock many documents for extended periods of time while they update a set of documents. These systems provide no indication of whether a document is currently open by another user.

One possible solution to providing indications of whether documents are currently open would involve a user registering for each document they are interested in knowing the status of. A significant drawback of such an approach is that it doesn't scale well for use in many operational environments. In some contexts, each user may potentially access very large numbers of documents (e.g. millions of documents). Under such circumstances, it may be time consuming and impractical for a user to register to receive status information for each document they access.

For the above reasons it would be desirable to have a scalable system that enables users to conveniently determine which documents are currently opened by other users, and that does not require users to register for each document in which they are interested.

SUMMARY OF THE INVENTION

To address the above described and other shortcomings of existing approaches, a new and scalable method and system are disclosed for providing indications of currently open documents. In the disclosed system, document open and close operations are detected, and conveyed to a server system in messages identifying the documents on which the operations were performed, the specific type of operation performed, and the identity of the user that performed the operation. The server system receives these document operation messages, and uses them to maintain lists of open documents associated with individual users. The open documents lists are stored in user database records that also indicate individual users' on-line status (e.g. on-line, off-line, available, unavailable, etc.).

When the server system transmits the on-line status of a user to other users that have an interest in that user (e.g. fellow members of a collaboration team, development project or the like, persons with that user in their buddy list, etc.), an open documents list for that user is included in the message along with his or her on-line status information. Client systems maintain lists of currently accessing users for each open document that they receive an identifier for in an open documents list contained in such on-line status messages.

Upon receipt of an on-line status message for a given user, client software compares the open documents list received with the message to the previously existing document list for that user. For each new document indicated in a received open documents list, the disclosed system determines whether any other user also has the document open. If so, a currently accessing users list already exists for the document. In that case, the disclosed system adds the user identifier of the user associated with the on-line status message to the previously generated currently accessing users list for that document. If no other user has the document open, then the disclosed system creates a new currently accessing users list for the document. The newly created accessing users list includes the user identifier of the user associated with the on-line status message.

For each document previously listed as open by the user, but that is no longer indicated in the most recently received document list, the disclosed system obtains the currently accessing users list for that document. The disclosed system then removes the user associated with the received on-line status message from the document's currently accessing users list. If the resulting currently accessing users list for the document is empty, then the entry for the document is removed from the data structure representing known open documents on the client system. That structure could be, but does not have to be implemented as a hash table. If the resulting currently accessing users list for the document is non-empty, then the updated entry for the document is stored with that non-empty currently accessing users list.

In one embodiment of the disclosed system, a user can select a user interface view, such as a file directory or other type of view showing visual indications of multiple shared documents, and the disclosed system allows them to see which documents are currently open by other users that are of interest to the local user. Alternative embodiments provide other perceptible, real time indications that documents are currently opened by other users of interest to the local user, such as audible indications (e.g. special sounds) or tactile indications (e.g. vibration), depending on the capabilities of the client system.

Users of interest to the local user may, for example, consist of fellow members of a collaboration team, development project or the like, persons in the user's instant messaging buddy list, or any other set of users that the local user is associated with by a system administrator, or that the local user has registered an interest in. The portion of the user interface providing indications of the shared documents, including visual and/or other perceptible indications of which of the documents are open by other users of interest to the local user, is referred to as an active documents view.

In order to provide the active documents view in the user interface, the disclosed system obtains a list of identifiers corresponding to the documents currently viewed in the user interface. The document identifiers are then checked to determine whether any of the documents are open by other users of interest, for example through checking the contents of a hash table representing the currently open documents. For any currently open documents, the disclosed system provides an indication that they are currently open. The open document indication is physically perceptible to the user, and could be a visual, auditory or tactile indication, based on the capabilities of the client system. The disclosed system may further allow the user to view which other users currently have a given document open, for example through a context menu provided by right clicking on a representation of an open document.

The system is scalable because the extra work required to run the system grows linearly with the number of users on the system.

Thus there is disclosed a scalable system that enables users to conveniently determine which documents are currently opened by other users of interest, and that does not require users to register for each document in which they are interested.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION OF EXEMPLARY EMBODIMENTS

Figure 1:
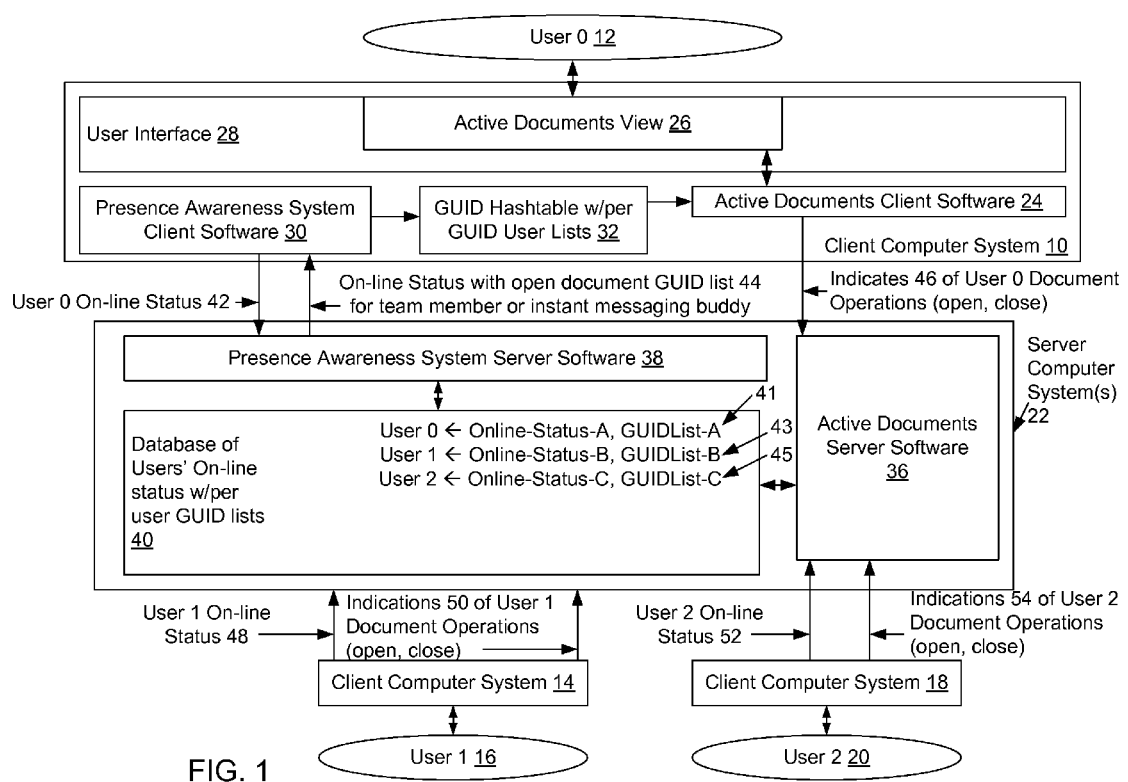
FIG. 1 is a block diagram showing software and hardware components in an illustrative embodiment of the disclosed system.

FIG. 1 is a block diagram showing software and hardware components in an illustrative embodiment of the disclosed system. As shown in FIG. 1, software and hardware components in an illustrative embodiment of the disclosed system include client computer system 10 associated with User 0 12, client computer system 14 associated with User 1 16, client computer system 18 associated with User 2 20, and server computer system(s) 22. Each of the client computer systems 10, 12 and 14 have executing thereon various software components providing aspects of the disclosed system, shown for purposes of illustration in client computer system 10 as including active documents client software 24, presence awareness system client software 30, and GUID hash table with per GUID user lists 32.

During operation of the embodiment shown in FIG. 1, the active documents client software 24 generates at least a portion of a user interface 28, including an active documents view 26. The user interface 28 may be any specific type of interactive user interface, such as, for example, a graphical user interface. The user interface 28 may be navigated using any specific type of user interface device, such as a computer keyboard or mouse, and/or using voice commands or the like.

In the illustrative example of FIG. 1, the active documents view 26 provides perceptible indications of documents that are currently opened by one or more other users in which User 0 12 has an interest. The indications open documents may be visual, auditory or tactile depending on the capabilities of the specific client system. For example, the active documents view 26 may include visual indications of which documents in a set of documents are currently opened by either User 1 16 and/or User 2 20. Alternatively, the client system may produce a specific sound to indicate that either User 1 16 and/or User 2 20 has a document open, or the client system could produce a specific tactile signal, such as a vibration (e.g. in the case of a cell phone client system or the like), to indicate that either User 1 16 and/or User 2 20 has a document open.

The set of other users in which User 0 12 has an interest may be defined in various specific ways. For example, in one embodiment, a user is considered to be interested in all other users that are members of a collaboration team or group in which that user is also a member. Accordingly, if User 0 12 is a member of a collaboration team or group that also includes User 1 16 and User 2 20, User 0 12 would be considered to have an interest in User 1 16 and User 2 20 based on their membership in the collaboration team or group with User 0 12. In an alternative embodiment, or additionally, users expressly register their interest in other users, for example by adding the other users to a buddy list or the like associated with a communication application such as instant messaging. In such an embodiment, a given user is considered to be interested in those other users that they have expressly added to their buddy list. For example, User 0 12 may have expressly indicated an interest in User 1 16 and User 2 20 by including User 1 16 and User 2 20 in a buddy list for an instant messaging application. The presence awareness system client software 30 may, for example, be client software for such an instant messaging application.

During operation of the embodiment shown in FIG. 1, the presence awareness system client software 30 receives on-line status for each other user in which the local user User 0 12 is interested. On-line status for a given user indicates whether they are available for a synchronous communication session (a "chat" session) provided to User 0 12 through the presence awareness system client software 30. Examples of on-line status indications include "on-line" or "available", indicating that a user is currently available for an instant messaging communication session, and "off-line" or "unavailable", indicating that a user is currently unavailable for an instant messaging communication session. The on-line status for other users may be broadcast periodically to the presence awareness system client software 30, or requested as needed by the presence awareness system client software 30 to maintain each user's on-line status.

At the same time it receives on-line status indication for each other user of interest to User 0 12, the presence awareness system client software 30 also receives an open documents list indicating the documents that other user currently has open. In this way, the open documents list for each other user of interest to the local user is bundled together in the same message containing the on-line status indication for that user. For example, as shown in FIG. 1, the presence awareness system client software 30 receives on-line status and open document GUID (Globally Unique Identifier) lists 44 for other users of interest, such as User 1 16 and User 2 20. Each GUID in an open document GUID list uniquely identifies a corresponding document that is currently opened by the other user of interest associated with the received on-line status indication. In such an embodiment the disclosed system, each document is assigned a GUID that is unique and opaque, in that the document represented by a given GUID cannot be found or otherwise reconstructed based solely on that GUID.

The presence awareness system client software 30 uses the open documents lists it receives to maintain a data structure representing all documents that are currently open by users of interest to the local user (User 0 12). One example of such a data structure is shown in FIG. 1 as the GUID hash table with per GUID accessing users lists 32. The hash table 32 includes a table entry for each document that is currently opened by another user of interest to User 0 12, and each entry in the hash table 32 further includes an accessing users list of user identifiers (UIDs) indicating which specific users of interest currently have the corresponding document open.

Whenever client software such as the active documents client software 24 needs to determine if a document is currently open by a person of interest to User 0 12, the client software performs a hash function on the GUID of that document, and uses the result to index into the hash table 32. If there is an entry in the hash table 32 for a GUID, then the document corresponding to that GUID is opened by at least one other user of interest to User 0 12. If there is no entry in the hash table 32 for a GUID, then the corresponding document is not currently opened by any other user of interest to User 0 12. Similarly, the presence awareness system client software 30 can also determine the current list of users currently accessing a given document by hashing on the GUID for that document and indexing into the hash table 32 with the result.

While a hash table is shown for purposes of illustration in the embodiment of FIG. 1, the disclosed system is not limited to such an embodiment. The hash table 32 is just one example of how currently open documents can be represented in the client computer system 10, and alternative representations may be used in the alternative as appropriate to provide efficient searching for currently open documents across the set of all documents in alternative embodiments.

Further during operation of the embodiment shown in FIG. 1, the on-line status of users, such as User 0 12, User 1 16, and User 2 20, is sent to server application software, shown in FIG. 1 as the presence awareness system server software 38. FIG. 1 shows User 0 on-line status 42, user 1 on-line status 48, and user 2 on-line status 52 all being provided to the presence awareness system server software 38. When users perform actions on documents, such as open and close operations, those actions are detected, and indications of those actions are communicated from the client computer systems to software also executing on the server computer system 22, shown for example as active documents server software 36. FIG. 1 shows indications 46 of User 0 document operations, indications 50 of User 1 document operations, and indications 54 of User 2 document operations being passed to the active documents server software 36. The detection of document operations may be performed on a client system, such as by the active documents client software 24 for operations of User 0 12, regarding operations on documents stored locally on the client system (e.g. on client computer system 10), and/or regarding operations on documents stored remote to the client system (e.g. on a file server that is part of or external to the server computer system(s) 22). The detection of document operations may alternatively or additionally be performed by software executing on the server computer system(s) 22.

The presence awareness system server software 38 uses the received indications of users' on-line status, as well as the indications of document operations it receives, to maintain a database of users' on-line status that further includes lists of documents currently open by each user for which on-line status is maintained, shown in FIG. 1 as the database of users' on-line status with per user GUID lists 40. Each entry (or "record") in the database 40 corresponds to a user for which on-line status is being maintained. Each entry in the database 40 further includes a list of documents currently open by the corresponding user. For example, as shown in FIG. 1, a record 41 in the database 40 includes the on-line status ("Online-Status-A") and open documents list ("GUIDList-A") for User 0 12, a record 43 includes the on-line status ("Online-Status-B") and open documents list ("GUIDList-B") for User 1 16, and record 45 includes the on-line status ("Online-Status-C") and open documents list ("GUIDList-C") for User 2 20. Based on a periodic broadcast approach (push model), or in response to client requests (pull model), the presence awareness system server software 38 includes both the on-line status and document list for a given user to the client system of each other user that is interested in that user, as shown in FIG. 1 as the on-line status and open document GUID lists 44 provided to client computer system 10 on behalf of User 0 12.

The client computer systems 10, 14 and 18, and the server computer system(s) 22, may each be embodied as any specific number of software processes and/or components executing on one or more hardware computer systems that are communicably connected. Such computer systems may, for example, each consist of at least one processor, program storage, such as memory or other computer-readable storage medium, for storing program code executable on the processor, one or more input/output devices and/or interfaces, such as data communication and/or peripheral devices and/or interfaces, and may each further include appropriate operating system software. The client computer systems 10, 14 and 18 may include any specific type of computer system or other type of client device, such as, for example, desktop computer systems, PDAs (Personal Digital Assistants), cell phones, tablet PCs, or any other appropriate device capable of providing the user interface 28 to a user. The client computer systems 10, 14 and 18, and the server computer systems 22 may be communicably connected using any specific type or kind of data communications network, including for example the Internet, a Local Area Network (LAN), or any other specific type of communication system or network.

Figure 2:
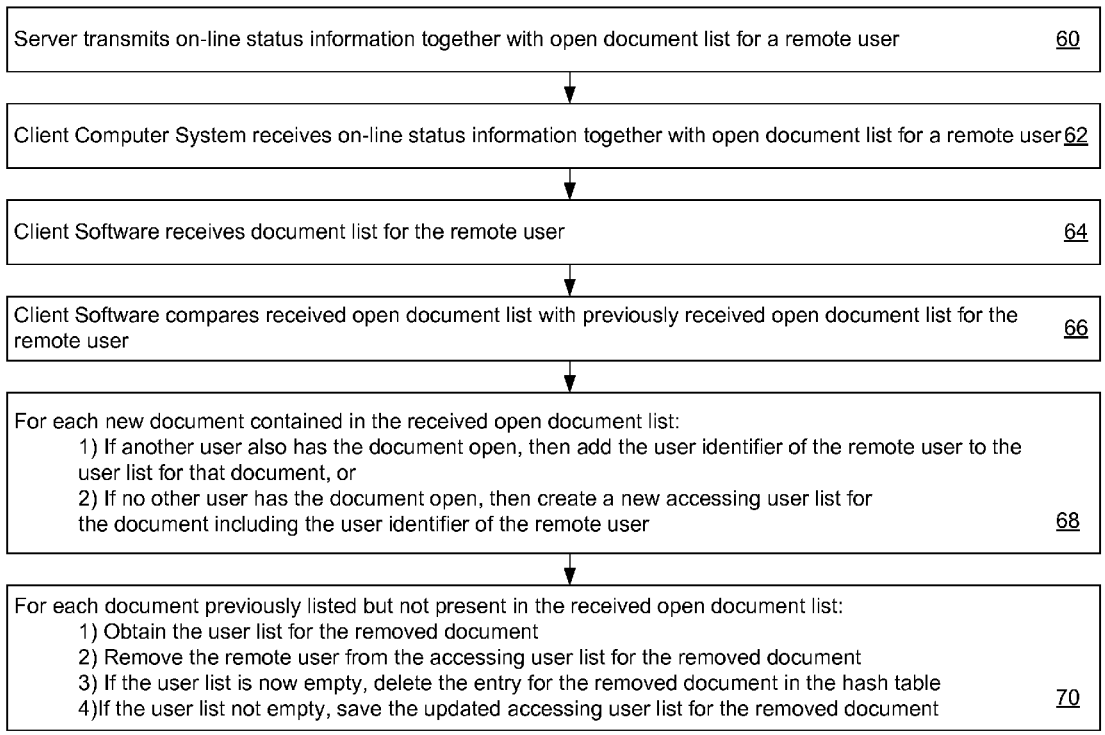
FIG. 2 is a flow chart showing steps performed at a client system receiving an open documents list for a user in an illustrative embodiment of the disclosed system.

FIG. 2 is a flow chart showing steps performed at a client system receiving an open documents list for a user in an illustrative embodiment of the disclosed system. As shown in FIG. 2, at step 60 a server system (e.g. presence awareness system server software 38 in FIG. 1) transmits on-line status information together with an open documents list (e.g. on-line status and GUID lists 44 of FIG. 1) for a remote user of interest to a local user. The on-line status information and open documents list are transmitted together at step 60 to a client computer system associated with the local user (e.g. client computer system 10 of FIG. 1). The on-line status information and open documents list transmitted together at step 60 may, for example, consist of the contents of a database record for the remote user extracted from a database of users' on-line status and open documents lists, such as a record from the database 40 shown in FIG. 1.

At step 62, the client computer system receives the on-line status and open documents list for a remote user of interest to the local user. For example, the remote user may be a member of a collaboration group or team that the local user is also a member of, or may be identified in a buddy list created by the local user. The on-line status and open documents list may, for example, be received simultaneously as parts of a single message received from a server system. The open documents list may further, for example, be made up of GUIDs of documents that are currently opened by the remote user. At step 64, the open documents list for the remote user is passed to client software responsible for maintaining the data structure representing the documents that are currently opened by other users of interest to the local user. Such client software may, for example, be part of the presence awareness system client software 30, and/or the active documents client software 24 shown in FIG. 1.

The client software of the disclosed system then operates at step 66 to compare the open documents list received at step 62 with a most recently received previous open documents list for the remote user. At step 68 the client software processes any new documents indicated in the current open documents list received at step 62, but not listed in the most recently received open documents list for the remote user. For each such new document indicated in a received open documents list, the client software determines whether any other user already has the document open. For example, if another user of interest to the local user has already opened the document, then an entry for that document would be located in the hash table 32 of FIG. 1 or the like, based on the hash of the GUID for the document. In that case, a currently accessing users list would already exist for the document. Accordingly, the client software operates to add the user identifier (UID) of the remote user to the previously generated accessing users list for the document. If no other user has the document open, then the client software creates a new currently accessing users list for the document. The newly created accessing users list includes the user identifier of the user associated with the on-line status message.

At step 70 the client software processes any documents that are not indicated in the open documents list received at step 62, but that are listed in a most recent previously received open documents list for the remote user. For each such document previously listed as open in the most recent previously received open documents list for the remote user, but not listed the current open documents list for the remote user received at step 62, the client software obtains a current accessing users list. The client software then removes the remote user from the document's currently accessing users list. If the resulting currently accessing users list for the document is empty, then the entry for the document is removed from the data structure representing known open documents on the client system (e.g. hash table 32 in FIG. 1). If the resulting currently accessing users list for the document is non-empty, then the updated entry for the document is stored, including the non-empty currently accessing users list.

Figure 3:
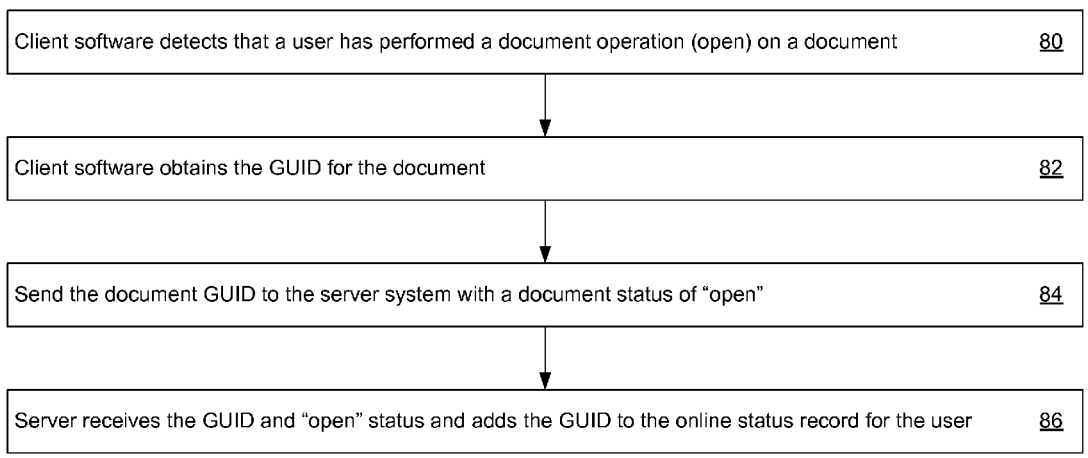
FIG. 3 is a flow chart showing steps performed upon detection of a document open operation in an illustrative embodiment of the disclosed system.

FIG. 3 is a flow chart showing steps performed upon detection of a document open operation in an illustrative embodiment of the disclosed system. As shown in FIG. 3, at step 80 the disclosed system detects that a user has performed an open document operation on a document. The detection at step 80 may, for example, be performed by client software such as the active documents client software 24 in the client computer system 10 of FIG. 1. The open document operation detected at step 80 may be the opening by the user of any specific type of document, using any specific type of application or other program code. Examples of documents for which open document operations may be detected by the disclosed system include Web pages, word processing documents, program code files, spreadsheets, or any other specific type of document or file.

At step 82, the client software obtains the GUID for the document that has been opened. The GUID for a document may, for example, be obtained from a service provided by a remote server system, which is responsible for providing GUIDs for all documents upon request. The client software may also store some number of document GUIDs locally for future access without having to go to the server system.

At step 84, the client software sends the document GUID obtained at step 82 to a server system with a document status of "open". For example, as shown in FIG. 1, the active documents client software 24 sends indications 46 of user 0 document operations to the active documents server software 36. The server software receives the GUID and "open" status at step 86, and adds the GUID to the open documents list contained in the on-line status record for the user of the client system (e.g. User 0 12).

Figure 4:
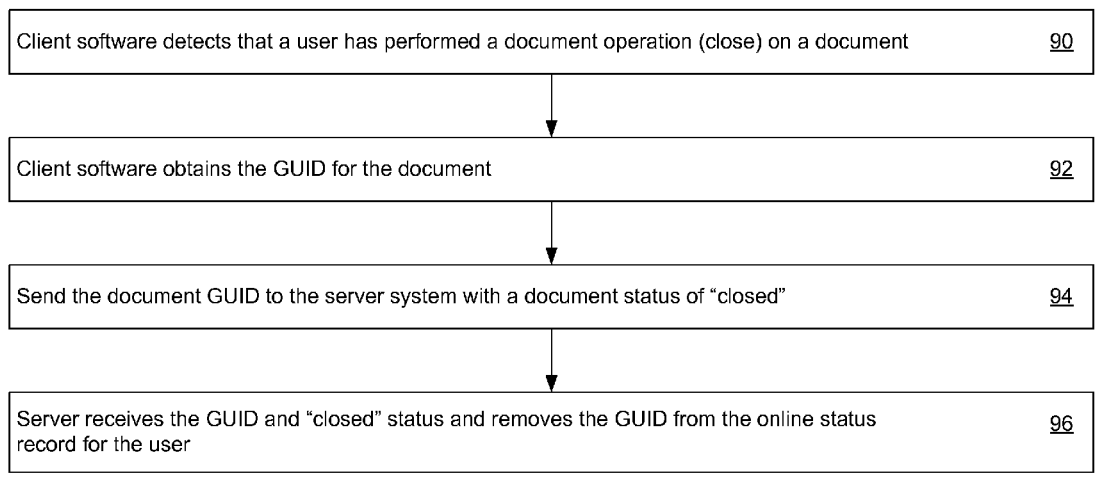
FIG. 4 is a flow chart showing steps performed upon detection of a document close operation in an illustrative embodiment of the disclosed system.

FIG. 4 is a flow chart showing steps performed upon detection of a document close operation in an illustrative embodiment of the disclosed system. As shown in FIG. 4, at step 90 the disclosed system detects that a user has performed a close document operation on a document. The detection at step 90 may, for example, be performed by client software such as the active documents client software 24 in the client computer system 10 of FIG. 1. The close document operation detected at step 90 may be the closing by the user of any specific type of document, using any specific type of application or other program code. Examples of documents for which close document operations may be detected by the disclosed system include Web pages, word processing documents, program code files, spreadsheets, or any other specific type of document or file.

At step 92, the client software obtains the GUID for the document that has been closed. The GUID for a document may, for example, be obtained from a service provided by a remote server system, which is responsible for providing GUIDs for all documents upon request. The client software may also store some number of document GUIDs locally for future access without having to go to the server system.

At step 94, the client software sends the document GUID obtained at step 92 to a server system with a document status of "closed". For example, as shown in FIG. 1, the active documents client software 24 sends indications 46 of user 0 document operations to the active documents server software 36. The server software receives the GUID and "closed"

status at step 96, and removes the GUID from the open documents list contained in the on-line status record for the user of the client system (e.g. User 0 12).

Figure 5:
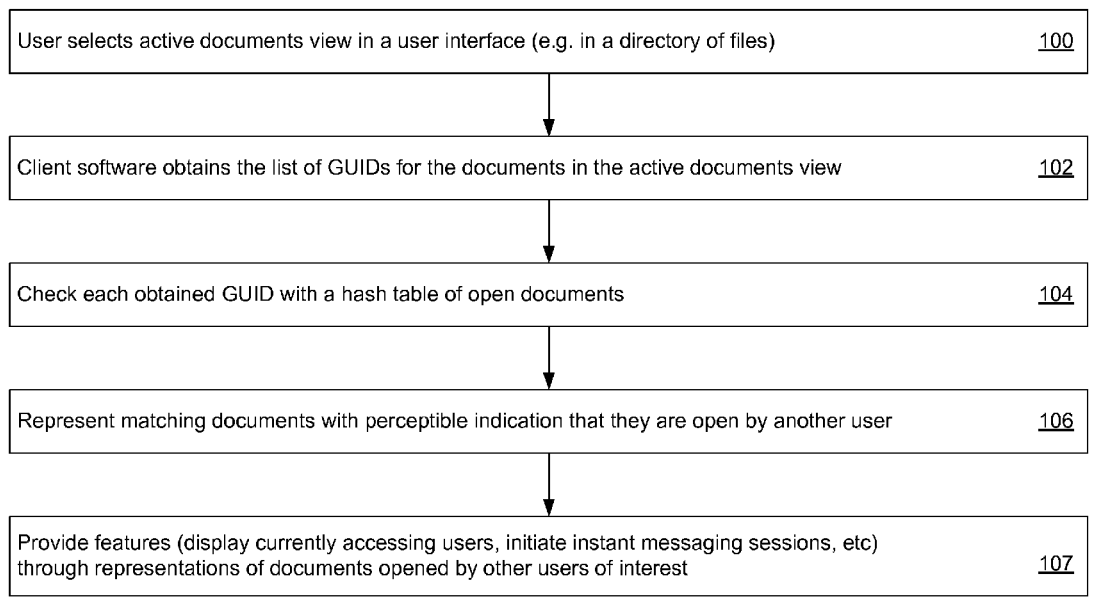
FIG. 5 is a flow chart showing steps performed to display indications of open documents in an illustrative embodiment of the disclosed system.

FIG. 5 is a flow chart showing steps performed to display indications of open documents in an illustrative embodiment of the disclosed system. In the example of FIG. 5, at step 100 the user selects an active documents view in a user interface. The active documents view (e.g. active documents view 26 in FIG. 1), may be any type of user interface that generates representations of multiple documents, wherein each document representation indicates whether the corresponding document is open or not open with respect to other, remote users in which the local user (e.g. User 0 12 in FIG. 1) has an interest. Examples of types of user interfaces that may be embodied using the disclosed system in the active documents view include directories of documents or files stored in a local or remote document repository that are shared across multiple users. Other examples of user interfaces through which an embodiment of the disclosed system can provide an active documents view include collaboration tool specific views of shared documents or files, as may be found in software tools that allow a group of users (e.g. User 0 12, User 1 16 and User 2 20 of FIG. 1) to work together on the same documents and/or projects over local and remote networks.

At step 102 the client software generating the active documents view obtains the GUID for each of the documents for which visual representations are being provided in the active documents view. GUIDs may be obtained at step 102 either from a service provided by a remote server system, or from a local store of document GUIDs on the client system. At step 104, the client software checks each of the GUIDs obtained at step 102 against a data structure indicating which documents are currently open by a user of interest to the local user. For example, at step 104 the client system may perform a hash function on each GUID and then use the result to index into the GUID hash table 32 shown in FIG. 1. If an index based on the GUID for a document matches an entry in the open document data structure checked at step 104, then that document is currently open by at least one user of interest to the local user. In that case, at step 106, the client software generating the active documents view provides distinct visual representations of those documents that are determined to be currently open by other users of interest to the local user. These distinct visual representations enable the user to quickly discern which documents represented in the active documents view are currently open by other users of interest to the local user.

While distinct visual representations are provided by one embodiment of the disclosed system to indicate documents that are currently open by other users of interest, this is just one example of the perceptible indications that may be provided in this regard, and the disclosed system is not limited to this specific notification technique. Accordingly, the client software may alternatively cause a specific sound to be produced, or cause a specific tactile signal to be generated, such as a vibration, as indication of documents open by other users of interest.

At step 107, the disclosed system operates to provide one or more features through the representations of documents that are currently open by other users of interest to the local user. For example, a context menu or other user interface object may be generated by the disclosed system, for example in response to the user right clicking on a representation of a document that is currently open by other users of interest to a local user. The context menu may provide the local user with various options related to the document. For example, a menu may be generated including menu options that, if selected by the user, cause the disclosed system to display the list of the other users of interest that are currently accessing the document (the currently accessing users list), or to automatically initiate an instant messaging session with a selected one of the other users of interest that are currently accessing the document.

Figure 6:
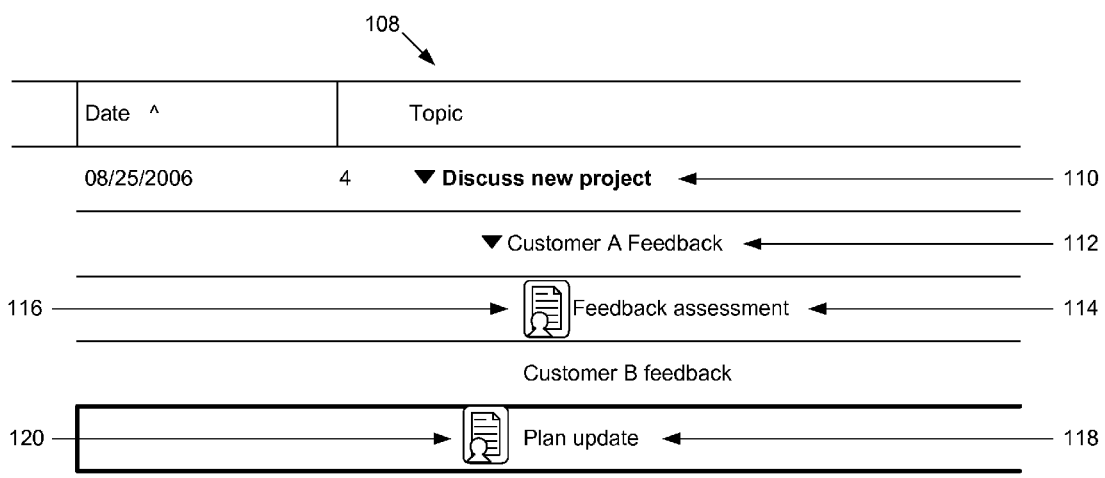
FIG. 6 is a portion of a first exemplary user interface provided by an illustrative embodiment of the disclosed system to indicate which documents are currently opened other users.

FIG. 6 is a portion of a first exemplary user interface provided by an illustrative embodiment of the disclosed system to indicate which documents are currently opened other users. The active documents view 108 shown in FIG. 6 is an example of a collaboration tool specific views of shared documents or files that may be provided by an embodiment of the disclosed system. The active document views user interface 108 of FIG. 6 includes a topic document 110, a first response document 112 that is a response to the topic document 110, and a second response document 114 that is a response to the first response document 112. The icon 116 is generated by the disclosed system in close visual proximity to the second response document 114 to provide a distinct visual indication to the user that the second response document 114 is currently open by at least one user of interest to the local user. Similarly, a third response document 118 has an icon 120 displayed in close visual proximity, and also indicating that the third response document 118 is currently open by at least one user of interest to the local user. Documents other than 114 and 118 in FIG. 6 are not currently open by any other users of interest to the local user. In one embodiment, right clicking on the icon 116 or the icon 120 causes the disclosed system to generate a context menu from which the user can select options related to the corresponding document. Such a context menu, for example, may include menu options that, if selected by the user, cause the disclosed system to display the list of the other users of interest that are currently accessing the corresponding document (the currently accessing users list), or to automatically initiate an instant messaging session with one or more of the other users of interest that are currently accessing the document.

Figure 7:
FIG. 7 is a portion of a second exemplary user interface provided by an illustrative embodiment of the disclosed system.

FIG. 7 is a portion of a second exemplary user interface provided by an illustrative embodiment of the disclosed system. The active documents view 130 shown in FIG. 7 is an example of a directory of shared documents or files that may be provided by an embodiment of the disclosed system. The active document views user interface 130 of FIG. 7 includes a file folder "src" 132, and a "build.properties" properties file 136 that is currently open by other users of interest to the local user. Other documents or files in the active documents view 130 besides 132 and 136 are not currently open by any other users of interest to the local user. In order to visually indicate that file folder "src" 132 and properties file "build.properties" 136 are currently open by other users of interest to the local file, the icon 134 is displayed adjacent to the entry in the active documents view 130 for the file folder "src" 132, and the icon 138 is displayed adjacent to the entry in the active documents view 130 for the properties file "build.properties" 136. In one embodiment, right clicking on the icon 134 or the icon 138 causes the disclosed system to generate a context menu from which the user can select options related to the corresponding document. Such a context menu, for example, may include menu options that, if selected by the user, cause the disclosed system to display the list of the other users of interest that are currently accessing the corresponding document (the currently accessing users list), or to automatically initiate an instant messaging session with a selected one of the other users of interest that are currently accessing the document.

While in the examples of FIG. 6 and FIG. 7, specific icons are used to visually indicate which files are currently opened by other users of interest to a local user, the disclosed system is not limited to such and approach, or to the specific type of icons shown in FIGS. 6 and 7. Accordingly, those skilled in the art will recognize the disclosed system may be embodied to provide any specific type or kind of visual indication to a user that a given file presented within the active documents view is currently open by another user of interest to the local user.

The disclosed system may be embodied to support various levels of access control with regard to protecting documents from being accessed by users not having access to them. In a first such embodiment, which is generally "open" with regard to document access among collaboration group members, and where most group members have access to most shared documents, then the use of opaque GUIDs to represent documents provides a potentially sufficient level of document protection. This arises from the fact that though a user may know that at least one other user currently has a document open, they cannot actually gain access to the document based on this information alone.

In an alternative approach, more security can be provided by filtering the GUIDList of a remote user before it is transmitted to a local user having interest in that remote user, in order to remove GUIDS for documents to which the local user does not have access. For example, in such an embodiment, the presence awareness system server software would remove the GUIDs for any documents that User 0 12 does not have access to when it transmits presence information (e.g. on-line status and GUID list) for a remote user (e.g. User 2 20) to the client computer system 10. Accordingly, access rights of User 0 12 would need to be made available to the presence awareness system server software 38, in order to prevent the GUIDs for any documents to which User 0 12 does not have access from being transmitted to the client computer system 10.

In another alternative embodiment, the functions provided by the presence awareness system client software 30, hash table 32 and active documents client software 24 may be provided within the server computer system(s) 22. In such an embodiment, when the User 0 12 browses a list of documents in the active documents view, a query for the open/closed status of each document in the list is passed to the server computer system 22. Software in the server computer system(s) 22 (e.g. presence awareness system server software 38) then returns the open/closed status of each document in the list to the client computer system 10 so that the active documents view 26 can be generated with indications of which documents are currently open by other users in which the local user has an interest. In such an embodiment, access filtering is performed at the server computer system through verification of the user's access rights before responding to a request for the open/closed status of a given document, and not responding to the request in the event that the requesting user does not have sufficient access rights to permit them to see whether the document is open. The checking of user access rights in this embodiment need only be performed in the event that the document is in fact open, and the access rights for one or more users may be cached on the server computer system.

The disclosed system provides many advantages. Among these are that no additional overhead is added at start up, beyond what is already performed by presence awareness applications (e.g. instant messaging) in order to collect the on-line status information of persons of interest to a local user (users listed in the local user's buddy list). The disclosed system also takes advantage of the fact that in a given user session, most documents to which a user has access are not opened. Since the only communication bandwidth required by the disclosed system is based on the number of open documents, the majority of documents do not generate any load, since they are not opened. Accordingly, documents represented in an active documents view user interface that are not open do not cause any additional network traffic.

The present invention can be realized in hardware, software, or a combination of hardware and software. A system according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable storage medium or memory that can direct a computer or other programmable data processing apparatus to function in a particular manner, such that the instructions stored in the computer-readable storage medium or memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

I claim:

1. A method for providing indications that documents are currently opened by other users in a group, comprising:

detecting a document open operation on a document, wherein said document open operation is performed by a first user;

sending an indication of said document open operation to a server system, wherein said indication of said document open operation further includes a user identifier of said first user and a document identifier of said document;

in response to receipt by said server system of said indication of said document open operation, adding said document identifier to a list of documents currently opened by said first user, wherein said list of documents currently opened by said first user is stored on said server system in an on-line status database entry associated with said first user, wherein said on-line status database entry associated with said first user further includes an on-line status of said first user;

sending on-line status of said first user from said server system to client systems associated with other users in said group, wherein said list of documents currently opened by said first user is sent together with said on-line status of said first user;

generating a perceptible indication by at least one of said client systems associated with said other users in said group that said at least one of said documents is currently opened by said first user;

receiving, by a client system associated with a second user that is one of said other users in said group, said list of documents currently opened by said first user together with said on-line status of said first user;

in response to receipt of said list of documents currently opened by said first user, comparing said received list of documents currently opened by said first user with a previously received list of documents currently opened by said first user;

in the event said received list of documents currently opened by said first user includes a new document identifier, wherein said new document identifier is not listed in said previously received list of documents opened by said first user, determining whether any user in said group currently has a document opened that is identified by said new document identifier; and in the event that another user in said group currently has said document opened that is identified by said new document identifier, adding said user identifier of said first user to a currently accessing users list associated with said new document identifier, wherein said currently accessing users list associated with said new document identifier is stored on said client system associated with said second user, and wherein said currently accessing users list associated with said new document identifier contains user identifiers indicating which specific ones of said users in said group currently have said document open that is identified by said new document identifier.

2. The method of claim 1, further comprising:

in the event that no other user in said group currently has said document opened that is identified by said new document identifier, adding an entry containing said new document identifier to a list of currently opened documents, wherein said entry further includes a currently accessing users list associated with said new document identifier, wherein said currently accessing users list includes said user identifier of said first user.

3. The method of claim 2, further comprising:

in the event said received list of documents currently opened by said first user does not include a previously listed document identifier contained in said previously received list of documents opened by said first user, determining whether any other user currently has a document opened that is identified by said previously listed document identifier; and in the event that another user currently has said document opened that is identified by said previously listed document identifier, removing said user identifier of said first user from a currently accessing users list associated with said previously listed document identifier.

4. The method of claim 3, further comprising:

in the event that no other user currently has said document opened that is identified by said previously listed document identifier, removing an entry from said list of currently opened documents, wherein said removed entry contains said previously listed document identifier.

5. The method of claim 4, further comprising:

providing a user interface view to said second user, wherein said user interface view includes indications of multiple shared documents;

wherein said indications of said shared documents each include indications of whether corresponding ones of said shared documents are currently opened by one or more users in said group;

wherein said indications of whether corresponding ones of said shared documents are currently opened by one or more users in said group are each made up of at least one of the group consisting of visual indications, auditory indications and tactile indications; and wherein said indications of whether corresponding ones of said shared documents are opened by one or more users in said group include said perceptible indication that said at least one of said documents is currently opened by said first user.

6. The method of claim 5, further comprising:

wherein said sending said on-line status of said first user from said server system to client systems associated with other users in said group includes filtering said list of documents currently opened by said first user to remove identifiers of documents to which specific ones of said other users in said group do not have access.

7. The method of claim 6, further comprising:

wherein said indications of whether said corresponding ones of said shared documents are currently opened by one or more users in said group further enable a local user to request display of lists of said one or more users in said group that are currently accessing corresponding ones of said shared documents.

8. A system including a computer readable storage medium, said computer readable storage medium having program code stored thereon for providing indications that documents are currently opened by other users in a group, said program code comprising:

program code for detecting a document open operation on a document, wherein said document open operation is performed by a first user;

program code for sending an indication of said document open operation to a server system, wherein said indication of said document open operation further includes a user identifier of said first user and a document identifier of said document;

program code for, in response to receipt by said server system of said indication of said document open operation, adding said document identifier to a list of documents currently opened by said first user, wherein said list of documents currently opened by said first user is stored on said server system in an on-line status database entry associated with said first user, wherein said on-line status database entry associated with said first user further includes an on-line status of said first user;

program code for sending on-line status of said first user from said server system to client systems associated with other users in said group, wherein said list of documents currently opened by said first user is sent together with said on-line status of said first user;

program code for generating a perceptible indication by at least one of said client systems associated with said other users in said group that said at least one of said documents is currently opened by said first user;

program code for receiving, by a client system associated with a second user that is one of said other users in said group, said list of documents currently opened by said first user together with said on-line status of said first user;

program code for, in response to receipt of said list of documents currently opened by said first user, comparing said received list of documents currently opened by said first user with a previously received list of documents currently opened by said first user;

program code for, in the event said received list of documents currently opened by said first user includes a new document identifier, wherein said new document identifier is not listed in said previously received list of documents opened by said first user, determining whether any user currently has a document opened that is identified by said new document identifier; and program code for, in the event that another user currently in said group has said document opened that is identified by said new document identifier, adding said user identifier of said first user to a currently accessing users list associated with said new document identifier, wherein said currently accessing users list associated with said new document identifier is stored on said client system associated with said second user, and wherein said currently accessing users list associated with said new document identifier contains user identifiers indicating which specific ones of said users in said group currently have said document open that is identified by said new document identifier.

9. The system of claim 8, said program code further comprising:

program code for, in the event that no other user currently has said document opened that is identified by said new document identifier, adding an entry containing said new document identifier to a list of currently opened documents, wherein said entry further includes a currently accessing users list associated with said new document identifier, wherein said currently accessing users list includes said user identifier of said first user.

10. The system of claim 9, said program code further comprising:

program code for, in the event said received list of documents currently opened by said first user does not include a previously listed document identifier contained in said previously received list of documents opened by said first user, determining whether any other user currently has a document opened that is identified by said previously listed document identifier; and program code for, in the event that another user currently has said document opened that is identified by said previously listed document identifier, removing said user identifier of said first user from a currently accessing users list associated with said previously listed document identifier.

11. The system of claim 10, said program code further comprising:

program code for, in the event that no other user currently has said document opened that is identified by said previously listed document identifier, removing an entry from said list of currently opened documents, wherein said removed entry contains said previously listed document identifier.

12. The system of claim 11, said program code further comprising:

program code for providing a user interface view to said second user, wherein said user interface view includes indications of multiple shared documents;

wherein said indications of said shared documents each include indications of whether corresponding ones of said shared documents are currently opened by one or more users in said group;

wherein said indications of whether corresponding ones of said shared documents are currently opened by one or more users in said group are each made up of at least one of the group consisting of visual indications, auditory indications and tactile indications; and wherein said indications of whether corresponding ones of said shared documents are opened by one or more users in said group include said perceptible indication that said at least one of said documents is currently opened by said first user.

13. The system of claim 12, wherein said program code for sending said on-line status of said first user from said server system to client systems associated with other users in said group includes program code for filtering said list of documents currently opened by said first user to remove identifiers of documents to which specific ones of said other users in said group do not have access.

14. The system of claim 13, further comprising:

wherein said indications of whether said corresponding ones of said shared documents are currently opened by one or more users in said group further enable a local user to request a display of lists of said one or more users in said group that are currently accessing corresponding ones of said shared documents.

15. A computer program product including a computer readable storage medium, said computer readable storage medium having program code stored thereon for providing indications that documents are currently opened by other users in a group, said program code comprising:

program code for detecting a document open operation on a document, wherein said document open operation is performed by a first user;

program code for sending an indication of said document open operation to a server system, wherein said indication of said document open operation further includes a user identifier of said first user and a document identifier of said document;

program code for, in response to receipt by said server system of said indication of said document open operation, adding said document identifier to a list of documents currently opened by said first user, wherein said list of documents currently opened by said first user is stored on said server system in an on-line status database entry associated with said first user, wherein said on-line status database entry associated with said first user further includes an on-line status of said first user;

program code for sending on-line status of said first user from said server system to client systems associated with other users in said group, wherein said list of documents currently opened by said first user is sent together with said on-line status of said first user;

program code for generating a perceptible indication by at least one of said client systems associated with said other users in said group that said at least one of said documents is currently opened by said first user;

program code for receiving, by a client system associated with a second user that is one of said other users in said group, said list of documents currently opened by said first user together with said on-line status of said first user;

program code for, in response to receipt of said list of documents currently opened by said first user, comparing said received list of documents currently opened by said first user with a previously received list of documents currently opened by said first user;

program code for, in the event said received list of documents currently opened by said first user includes a new document identifier, wherein said new document identifier is not listed in said previously received list of documents opened by said first user, determining whether any user currently has a document opened that is identified by said new document identifier; and program code for, in the event that another user in said group currently has said document opened that is identified by said new document identifier, adding said user identifier of said first user to a currently accessing users list associated with said new document identifier, wherein said currently accessing users list associated with said new document identifier is stored on said client system associated with said second user, and wherein said currently accessing users list associated with said new document identifier contains user identifiers indicating which specific ones of said users in said group currently have said document open that is identified by said new document identifier.

* * * * *